United States Patent
Sjöö et al.

(10) Patent No.: US 7,780,381 B2
(45) Date of Patent: Aug. 24, 2010

(54) SLOT MILLING CUTTER

(75) Inventors: Sture Sjöö, Gävle (SE); Helena Olsson, Gävle (SE); Per Forssell, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 516 days.

(21) Appl. No.: 10/589,608

(22) PCT Filed: Feb. 17, 2005

(86) PCT No.: PCT/SE2005/000216

§ 371 (c)(1),
(2), (4) Date: Jun. 4, 2007

(87) PCT Pub. No.: WO2005/080038

PCT Pub. Date: Sep. 1, 2005

(65) Prior Publication Data

US 2008/0044239 A1 Feb. 21, 2008

(30) Foreign Application Priority Data

Feb. 20, 2004 (SE) .................................. 0400385

(51) Int. Cl.
*B23C 5/10* (2006.01)
*B23B 27/04* (2006.01)
(52) U.S. Cl. ........................................ 407/113; 407/66
(58) Field of Classification Search ............... 407/53, 407/113–116, 66, 67
See application file for complete search history.

(56) References Cited

U.S. PATENT DOCUMENTS

| 1,681,675 | A | * | 8/1928 | Miller ........................ 407/49 |
| 1,960,319 | A | * | 5/1934 | Severson .................... 408/169 |
| RE21,068 | E | * | 5/1939 | Miller ........................ 407/96 |
| 2,229,112 | A | * | 1/1941 | Dornhoffer et al. .......... 407/38 |
| 2,378,215 | A | * | 6/1945 | Grayson ..................... 407/39 |
| 2,863,210 | A | * | 12/1958 | Tucker ...................... 407/45 |
| 3,124,864 | A | * | 3/1964 | Frommelt et al. .......... 407/109 |
| 3,467,416 | A | * | 9/1969 | Gourley ..................... 403/377 |
| 4,733,995 | A | | 3/1988 | Aebi ......................... 407/34 |
| 4,946,318 | A | * | 8/1990 | David et al. ................ 407/42 |
| 5,529,439 | A | | 6/1996 | Werner et al. ............... 407/39 |
| 6,102,630 | A | | 8/2000 | Flolo ......................... 407/42 |
| 6,499,917 | B1 | | 12/2002 | Parker et al. ................ 407/25 |
| 6,619,892 | B2 | | 9/2003 | Enquist ...................... 407/36 |

FOREIGN PATENT DOCUMENTS

| DE | 100 60 283 | | 6/2000 |
| WO | WO 2004062839 | A1 * | 7/2004 |
| WO | WO 2005080037 | A1 * | 9/2005 |

* cited by examiner

*Primary Examiner*—Will Fridie, Jr.
(74) *Attorney, Agent, or Firm*—Drinker Biddle & Reath LLP

(57) ABSTRACT

A slot milling cutter, which comprises a cutting head as well as a fastener integrated with the cutting head, which fastener is intended to be received in a tool coupling, the cutting head being provided with at least two insert seats, and cutting inserts being mounted in the insert seats. The invention also relates to a cutting insert separately.

13 Claims, 7 Drawing Sheets

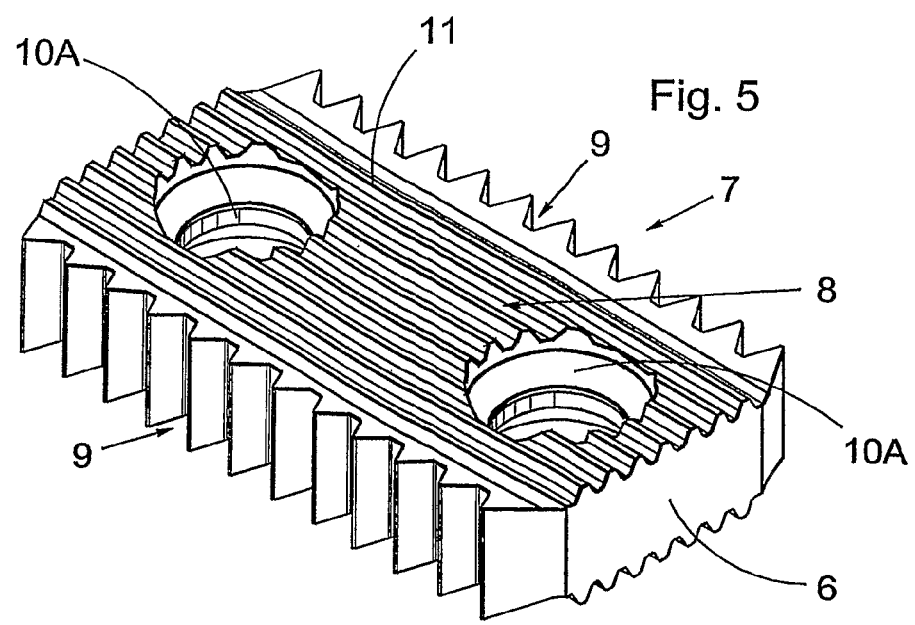
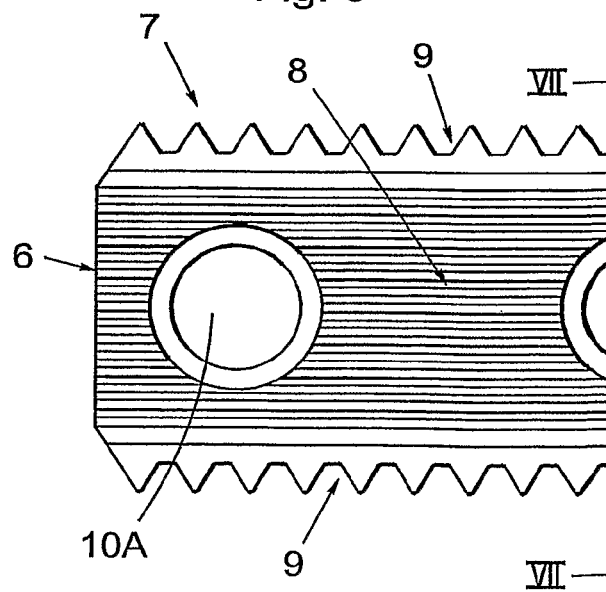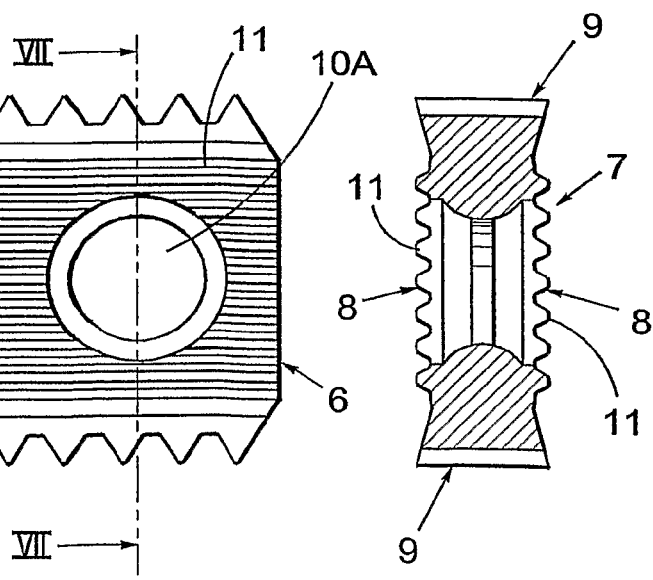

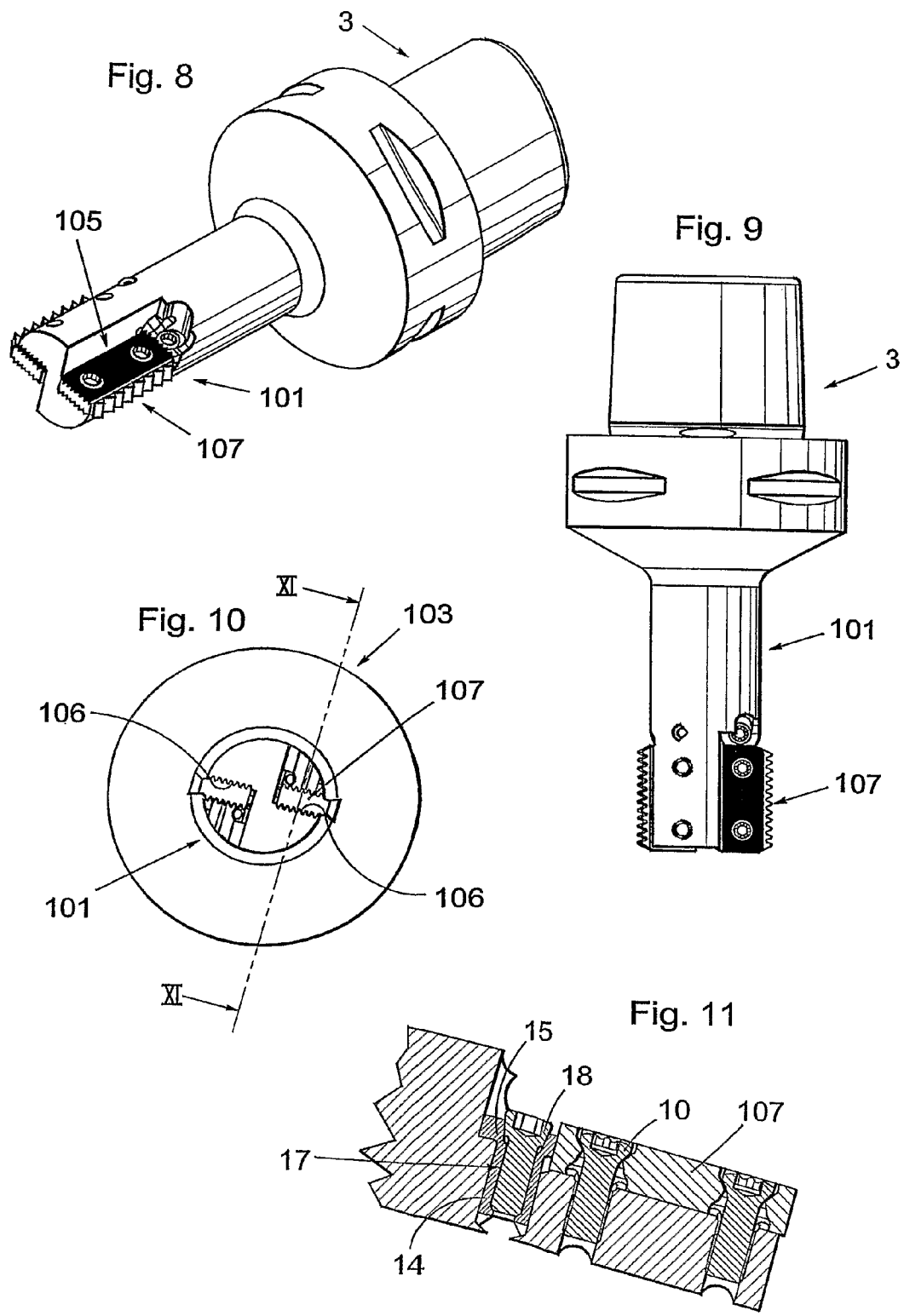

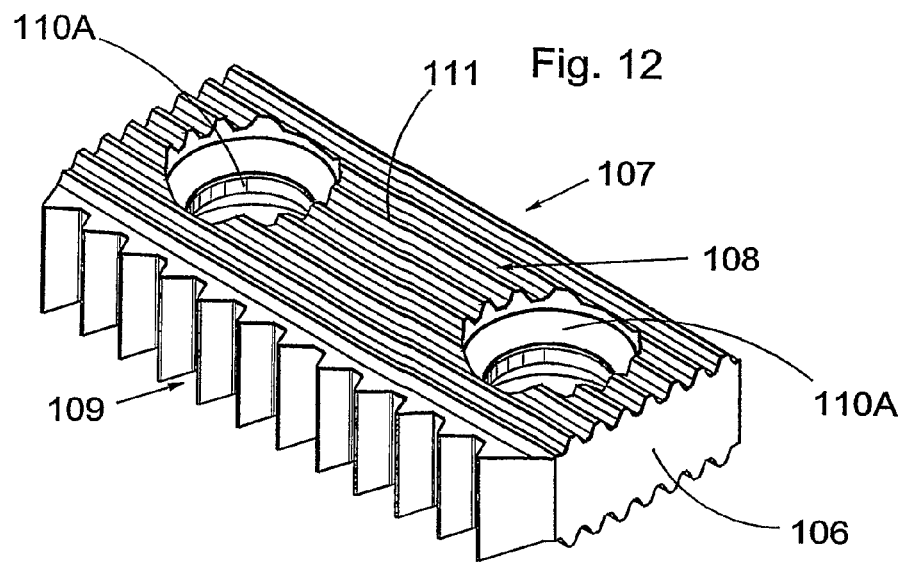
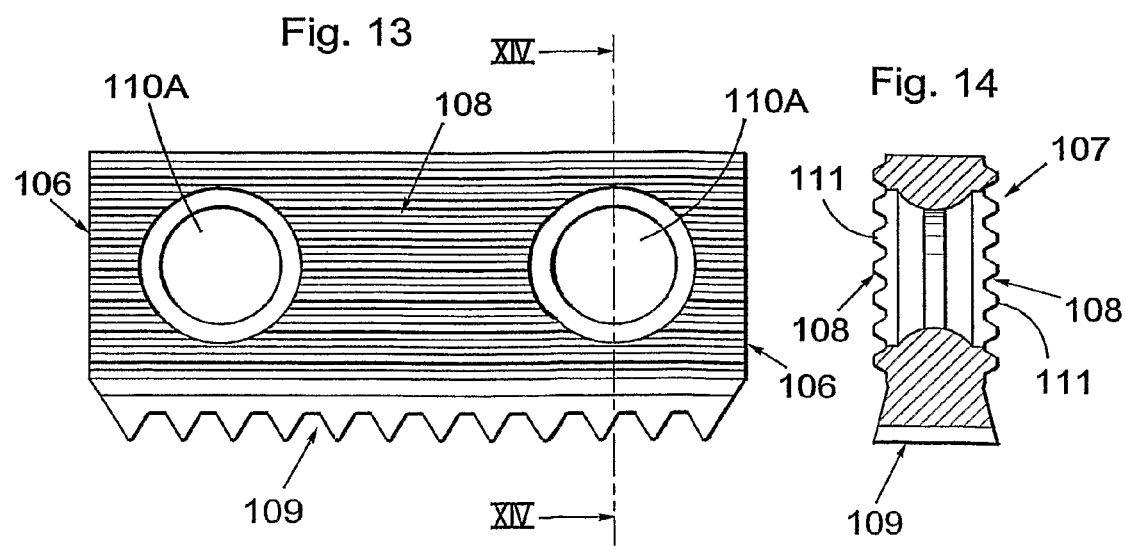

US 7,780,381 B2

SLOT MILLING CUTTER

TECHNICAL FIELD OF THE INVENTION

The present invention relates to a slot milling cutter, which comprises a cutting head as well as a fastener integrated with the cutting head, which fastener is intended to be received in a tool coupling, the cutting head having at least two insert seats, in which cutting inserts, included in the slot milling cutter and having teeth along at least one side that extends in the axial direction of the slot milling cutter, are received, as well as means to mount the cutting inserts in the respective insert seats thereof. The invention also separately relates to a cutting insert. The slot milling cutter according to the present invention is primarily intended to be used in thread cutting, however, the slot milling cutter may also be used in the manufacture of splines or cog wheels.

PRIOR ART

By EP-A1-1198321, a thread-milling cutter is previously known, which is provided with a number of cutting inserts. Each cutting insert has two edges on the part of the cutting insert that projects radially from a tool head of the thread-milling cutter. Both these edges can be used by the fact that the cutting insert can be indexed in respect of a symmetry plane. The cutting inserts are fixed in the insert seats thereof of the tool head by screws intersecting the wall of the insert seat and coming to abutment against a surface of a fixing part of the cutting insert.

By WO-A1-0200382, an adjusting mechanism is previously known for cutting inserts that preferably are included in a face milling cutter. In that connection, the individual cutting insert is brought to be displaced in the insert seat thereof by the fact that a sleeve arranged adjacent to the cutting insert expands in the radial direction by a screw being received in the sleeve, the conical head of the screw providing radial expansion of the sleeve. The radial expansion is facilitated by the sleeve being provided with axial slots. The possibility of adjusting the positions of the cutting inserts leads to that the run-out of the milling cutter can be decreased.

By U.S. Pat. No. 5,873,684, a thread-milling cutter is previously known having a plurality of thread-cutting inserts, which are received in the respective insert seats. Each insert seat is provided with means in order to impart the appurtenant cutting insert with a support in the axial direction of the milling cutter, this means consisting of a generally cylindrical pin, which has a planar, longitudinal contact surface on the envelope surface thereof.

OBJECTS AND FEATURES OF THE INVENTION

A primary object of the present invention is to provide a slot milling cutter of the above defined kind, wherein the cutting inserts applied in the insert seats should be imparted with an exceptionally good positional fixation.

Another object of the present invention is to enable axial adjustment of at least some of the cutting inserts that is provided on the slot milling cutter.

At least the primary object is realised by means of a slot milling cutter having the features defined in the subsequent independent claim 1. Preferred embodiments of the invention are defined in the dependent claims.

BRIEF DESCRIPTION OF THE DRAWINGS

Below, an embodiment of the invention will be described, reference being made to the accompanying drawings, where:

FIG. 5 shows a perspective view of a cutting insert that is provided on the slot milling cutter according to FIG. 1;

FIG. 6 shows a planar view of the cutting insert according to FIG. 5;

FIG. 7 shows a section according to VII-VII in FIG. 6;

FIG. 8 shows a perspective view of an alternative embodiment of a slot milling cutter according to the present invention;

FIG. 9 shows a planar view of the slot milling cutter according to FIG. 8;

FIG. 10 shows an end view of the slot milling cutter according to FIG. 8;

FIG. 11 shows a section according to XI-XI in FIG. 10;

FIG. 12 shows a perspective view of a cutting insert that is provided on the slot milling cutter according to FIG. 8;

FIG. 13 shows a planar view of the cutting insert according to FIG. 12;

FIG. 14 shows a section according to XIV-XIV in FIG. 13;

DETAILED DESCRIPTION OF PREFERRED EMBODIMENTS OF THE INVENTION

Figure 1:
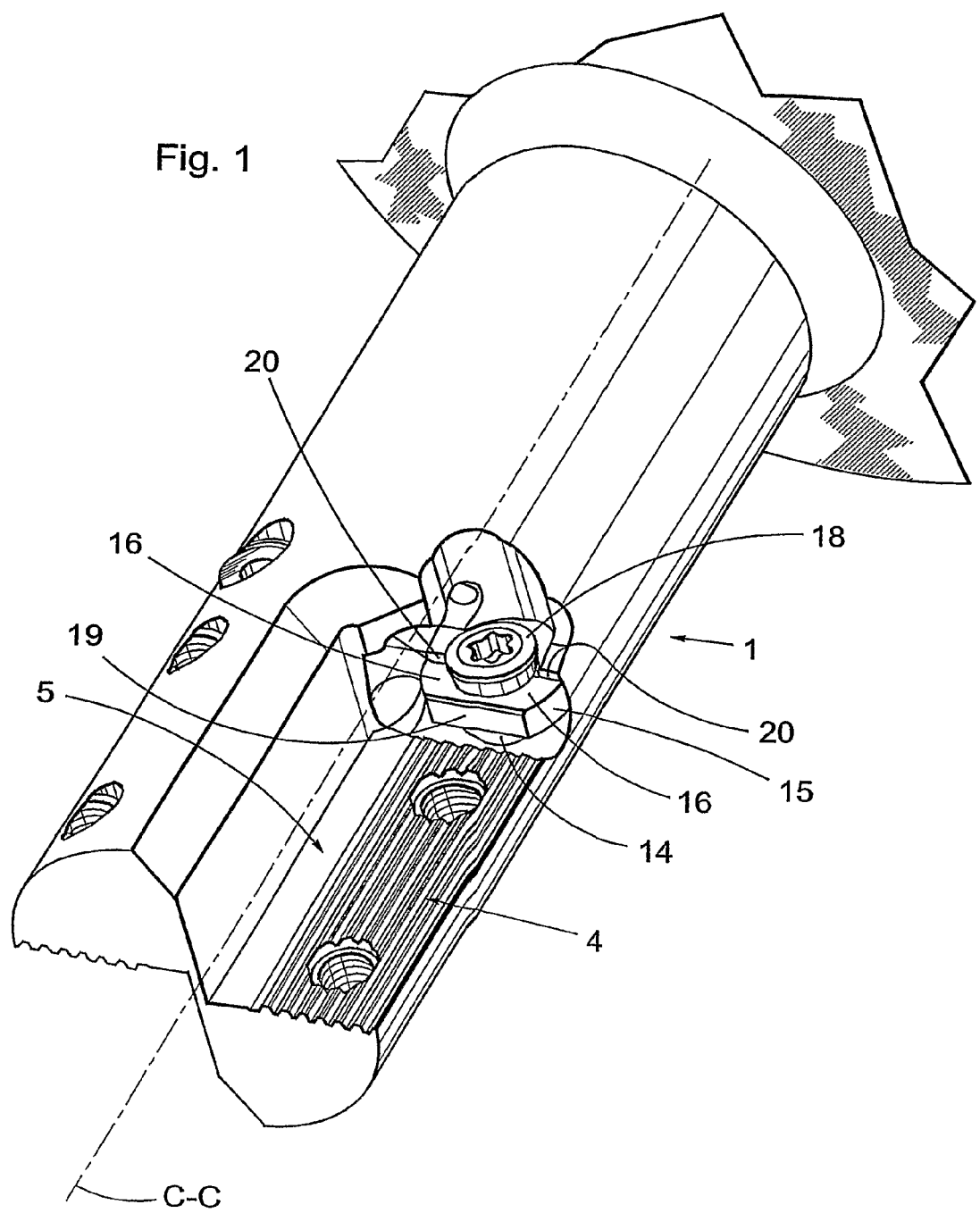
FIG. 1 shows a perspective view of a slot milling cutter according to the present invention, for reasons of clarity the cutting inserts not being mounted in the respective insert seats thereof.
Figure 2:
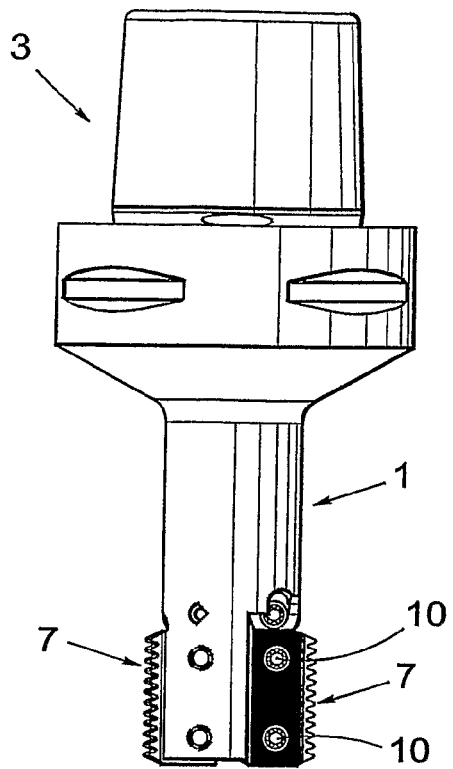
FIG. 2 shows a planar view of the slot milling cutter, which is provided with cutting inserts.
Figure 3:
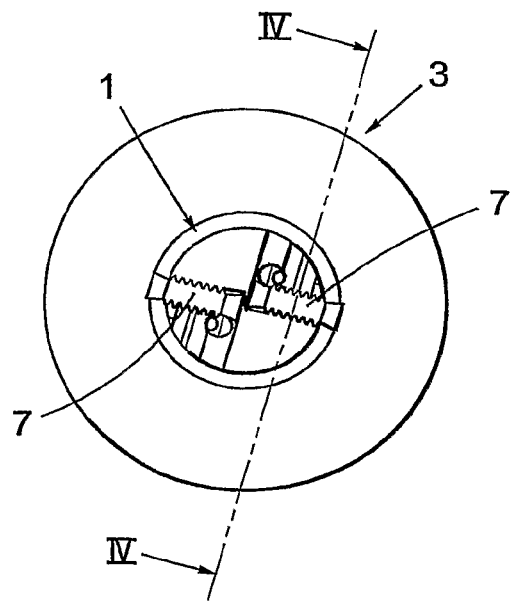
FIG. 3 shows an end view of the slot milling cutter according to FIG. 2.

The slot milling cutter shown in FIGS. 1-4 comprises a cutting head 1 as well as a fastener 3 integrated with the cutting head, which fastener is intended to be received in a tool coupling, the cutting head 1 having two insert seats 5, in which cutting inserts 7, included in the slot milling cutter and generally being parallelepipedic, are received. The line C-C in FIG. 1 defines both the axial direction of the slot milling cutter as well as the axis of rotation thereof.

Each cutting insert 7 comprises two main surfaces 8, which are mutually parallel. Each cutting insert 7 is furthermore defined by two toothed edge sides 9, which also are mutually parallel. An additional delimitation of the cutting insert 7 is effected by two end sides 6, which in the embodiment illustrated are entirely smooth.

The slot milling cutter also comprises means to fix the cutting inserts 7 in the respective insert seats 5 thereof, said means in the embodiment illustrated consisting of two screws 10 of each cutting insert 7, said screws 10 being received in two through holes 10A of each cutting insert 7.

As is seen in FIG. 1, the cutting head 1 is generally in the shape of a circular cylinder, the insert seats 5 constituting two diametrically arranged recesses in the area of the free end of the cylinder. Each insert seat 5 is defined by two surfaces extending perpendicularly to each other, one of said surfaces carrying the cutting insert 7. As is most clearly seen in FIG. 1, said surface is provided with first serrations 4, which extend in the axial direction of the slot milling cutter. The cutting insert 7 is provided with second serrations 11, which will be described more thoroughly below, reference being made to FIGS. 5-7. The first serrations 4 of the insert seats 5 are intended to co-operate with the second serrations 11 of the cutting insert 7. Thereby, a stabilization of the positioning of the cutting insert 7 in the radial direction of the slot milling cutter is accomplished, i.e., perpendicularly to the axial direction C-C of the slot milling cutter.

Figure 4:
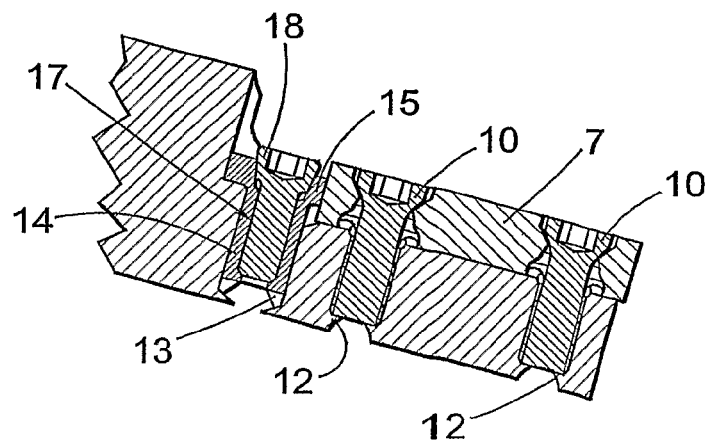
FIG. 4 shows a section according to IV-IV in FIG. 3.

As has been mentioned above, each cutting insert is fastened in the appurtenant insert seat 5 thereof by means of two screws 10, in FIG. 4 it is being shown how said screws 10 are going through the cutting insert 7 and with the threaded portions thereof being received in threaded holes 12 of the cutting head 1.

The slot milling cutter according to the present invention is also provided with means to adjust the positions of the cutting inserts 7 in the axial direction of the slot milling cutter. For this purpose, a recess 13 having a circular cross-section is arranged in each insert seat 5 of the cutting head 1. The recess 13 is located inside of the cutting insert 7, as seen from the free end of the cutting head 1. In the recess 13, a sleeve 14 is received, the sleeve 14 co-operating with the recess 13 via a relatively tight slide fit. In the area of the upper end of the sleeve 14, the same is provided with a collar 15. The sleeve 14 is provided with two diametrically located, axial slots, which go through the collar 15 and extend a distance into the sleeve 14. The collar 15 is formed in a special way. As is seen in FIG. 1, the collar 15 is formed with stop portions 16, which are brought to co-operate with stop faces 20 of the cutting head 1. Thereby, the sleeve 14 is prevented from rotating in relation to the cutting head 1.

The collar 15 also has a chamfered portion 19, which in the correct position of the sleeve 14 is facing the part of the insert seat 5 that has first serrations 4. The chamfered portion 19 of the collar 15 is intended to abut against a cutting insert 7 mounted in the insert seat 5. This is seen in FIG. 4, which shows how the chamfered portion 19 abuts against the end surface of a cutting insert 7.

The sleeve 14 is internally threaded and intended to receive a set screw 17, which is provided with a conical head 18. When the set screw 17 is received in the sleeve 14, the conical head 18 will co-operate with the collar 15 in such a way that the farther the set screw 17 is threaded into the sleeve 14, the larger external diameter is imparted to the collar 15. This change of diameter of the collar 15 involves an axial displacement of the cutting insert 7, this practically taking place in such a way that the cutting insert 7 is mounted in the insert seat 5, and then the screws 10 are mounted and tightened so much that a satisfactory co-operation between the serrations 4, 11 of the insert seat 5 and the cutting insert 7, respectively, is established. Next, the necessary axial adjustment of the cutting insert 7 in the insert seat 5 is effected by suitable tightening of the set screw 17, the actual displacement of the cutting insert 7 taking place by co-operation between the collar 15 of the sleeve 14 and the cutting insert 7. In connection with the displacement of the cutting insert 7, a certain bending and thereby prestressing of the screws 10 will occur. After the cutting inserts 7 is correctly adjusted in relation to each other, the final tightening of the screws 10 is effected.

Since the slot milling cutter according to the present invention is provided with at least two cutting inserts, it is of great importance that the slot milling cutter has means for the axial adjustment of the cutting inserts 7. Otherwise the cutting inserts 7 cannot be brought to co-operate in a satisfactory way.

In FIGS. 5-7, a cutting insert 7 with which the slot milling cutter according to the present invention is provided with is shown in detail. As is seen in FIGS. 5-7, the cutting insert 7 is provided with second serrations 11 on both main surfaces 8 thereof. The cutting insert 7 is also provided with two toothed edge sides 9, which are located on opposed longitudinal side surfaces of the cutting insert 7. The cutting insert 7 generally has a negative basic shape, while the cutting insert 7 has a positive cutting geometry, which most clearly is seen in FIG. 7. The design of the cutting insert 7 allows it to be mounted in four different ways in the insert seat 5. On one hand, any one of the two main surfaces 8 of the cutting insert 7 can abut against the serrations 4 of the insert seat 5 and on the other hand, any one of the two edge sides of the cutting insert 7 can be turned outward.

The alternative embodiment of a slot milling cutter according to the present invention shown in FIGS. 8-11 differs principally from the embodiment according to FIGS. 1-4 by the fact that the slot milling cutter is provided with cutting inserts 107 having only one toothed edge side 109, see FIG. 12-14. In other respects, the cutting insert 107 as well as the cutting insert 7 comprises two main surfaces 108 and two end sides 106, the main surfaces 108 being provided with second serrations 111. The cutting insert 107 is also provided with two through holes 110A.

Upon a comparative study of the cutting head 101 in the embodiment according to FIGS. 8-11 and the cutting head 1 in the embodiment according to FIGS. 1-4, it is seen that the cutting head 101 has more material in the centre, i.e., it has a generally more robust construction and is thereby stiffer, which may be of importance in order to reduce the tolerance errors of the holes in which threads are formed. The reason for the cutting head 101 having more material in the centre is of course that the cutting insert 107 only has one toothed edge side 109.

As for the fastener 3 of the embodiment according to FIGS. 8-11, it may be identically formed as the fastener 3 in the embodiment according to FIGS. 1-4. For that reason, these details have been given the same reference designations.

As for the adjustment means in each insert seat 105, the same may have a principally similar design as in the embodiment according to FIGS. 1-4. For that reason, the components included in the adjustment means have been given the same reference designations as in the embodiment according to FIGS. 1-4.

Figure 15:
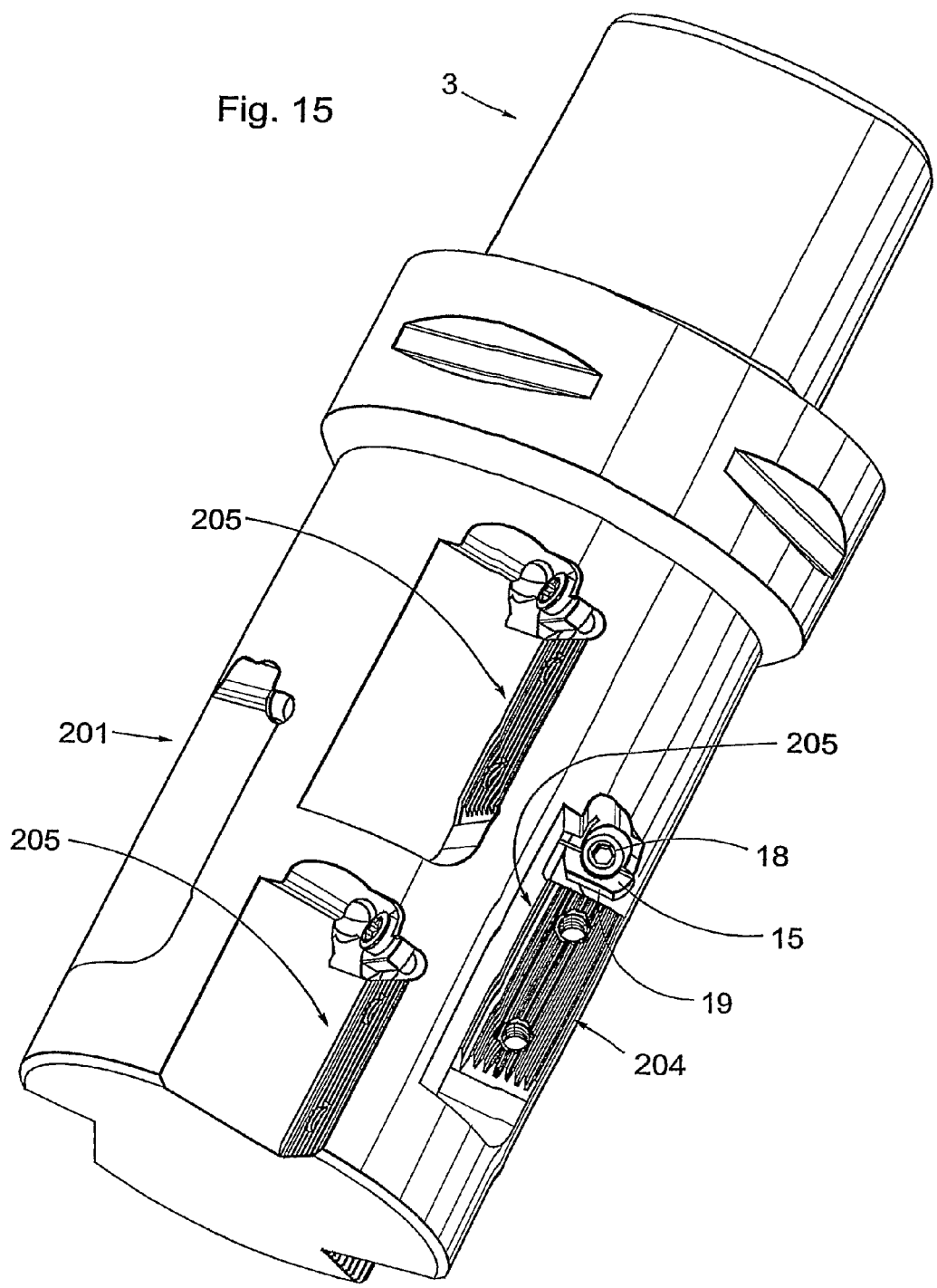
FIG. 15 shows a perspective view of an additional, alternative embodiment of a slot milling cutter according to the present invention, for reasons of clarity cutting inserts not being mounted in the insert seats of the slot milling cutter.
Figure 16:
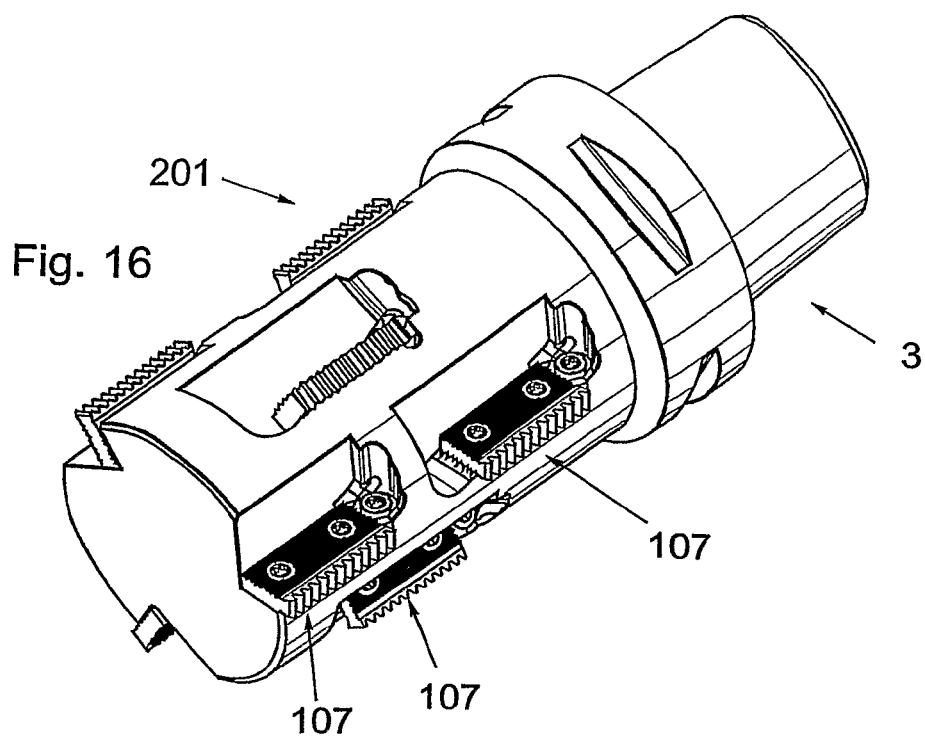
FIG. 16 shows a perspective view of the slot milling cutter according to FIG. 15, cutting inserts being mounted in the respective insert seats thereof.
Figure 17:
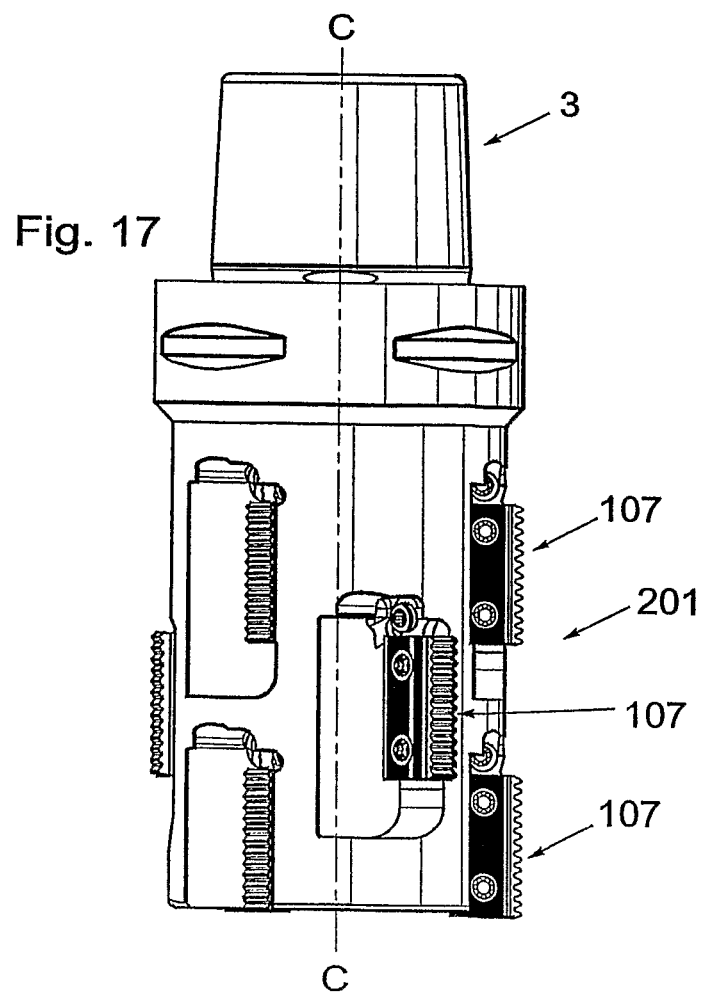
FIG. 17 shows a side view of the slot milling cutter according to FIG. 16.

The additional, alternative embodiment of a slot milling cutter according to the present invention shown in FIGS. 15-17 comprises totally nine insert seats 205, in which cutting inserts 107 can be mounted, wherein these cutting inserts may be identical with the cutting inserts 107 in the embodiment according to FIGS. 8-14. Each insert seat 205 is provided with second serrations 204 and with means to adjust the positions of the cutting inserts 107 in the axial direction of the slot milling cutter, said adjustment means may have a principally similar design as in the embodiment according to FIGS. 1-4. For that reason, the components in the adjustment member shown in FIG. 15 have been given the same reference designations as in the embodiment according to FIGS. 1-4.

In the embodiment according to FIGS. 15-17, three insert seats 205/cutting inserts 107 are included in one and the same group with mutually different axial location, the axially intermediate cutting insert 107 overlapping the two other cutting inserts 107 included in the group in the axial direction C-C of the slot milling cutter 201. In the embodiment according to FIGS. 15-17, it is of exceptionally great importance that the insert seats 205 have adjustment means for the position adjustment of the cutting inserts 107 in the axial direction C-C of the slot milling cutter 201. On one hand, the cutting inserts 107 should be adjusted mutually in the group, and on the other hand the adjustment should take place between the groups.

Feasible Modifications of the Invention

In the above-described embodiments, each insert seat 5; 105 of the cutting head 1; 101 is provided with means to adjust the position of the appurtenant cutting insert in the axial direction of the slot milling cutter. However, within the scope of the present invention, it is also feasible that only one of the insert seats 5; 105 is provided with means for axial adjustment. In case the cutting head is provided with more than two insert seats, always one insert seat may lack means for the axial adjustment.

In the above-described embodiments, the cutting head 1; 101 is provided with two insert seats 5; 105. However, within the scope of the present invention, it is also feasible that the cutting head is provided with more than two insert seats.

In the above-described embodiments, the cutting inserts 7; 107 are provided with serrations 11; 111 on both the main surfaces 8; 108 thereof. However, within the scope of the present invention, it is also feasible that only one main surface is provided with serrations.

In the above-described embodiments, the cutting inserts 7; 107; 207 are provided with two through holes. However, within the scope of the present invention, it is also feasible that the cutting inserts has one hole or more than two holes.

The invention claimed is:

1. Slot milling cutter, which comprises a cutting head as well as a fastener integrated with the cutting head, the cutting head being provided with at least two insert seats, and cutting inserts being mounted in the insert seats wherein the insert seats are provided with first serrations, that the cutting inserts are provided with second serrations, which are arranged on at least one main surface of the cutting inserts, that the first and second serrations extend in the axial direction of the slot milling cutter, that a stabilization of the cutting insert is effected in the radial direction of the slot milling cutter by co-operation between the first and second serrations, and that adjacent to at least one of the insert seats, means are arranged to apply a force to the appurtenant cutting insert in the axial direction of the slot milling cutter in order to adjust the position of the cutting insert.

2. Slot milling cutter according to claim 1, wherein all insert seats are provided with means to apply a force to the appurtenant cutting inserts in the axial direction of the slot milling cutter.

3. Slot milling cutter according to claim 1, wherein the cutting inserts are provided with serrations on both the main surfaces thereof.

4. Slot milling cutter according to claim 1, wherein the cutting inserts have a negative basic shape, and that the cutting inserts have a positive cutting geometry.

5. Cutting insert for use as a replaceable cutting insert in a slot milling cutter, the cutting insert being mounted in an insert seat of the slot milling cutter, and the cutting insert comprising opposing top and bottom surfaces, either of which is to be in direct contact with the insert seat when mounted and two opposing side surfaces that separate the opposing top and bottom surfaces, wherein at least one of the opposing side surfaces has a toothed edge and the opposing top and bottom surfaces are each provided with serrations, and wherein the serrations extend parallel to the at least one opposing side surface having the toothed edge of the cutting insert.

6. Cutting insert according to claim 5 wherein it has a negative basic shape and positive cutting geometry.

7. Cutting insert according to claim 5, wherein each of the opposing side surfaces have a toothed edge.

8. Slot milling cutter according to claim 1, wherein the surface of the insert seats provided with first serrations include at least one threaded hole for receiving an at least one screw passing through a through hole in the appurtenant cutting insert to attach the appurtenant cutting insert to the insert seat.

9. Slot milling cutter according to claim 1, wherein the means to apply a force to the appurtenant cutting insert in the axial direction includes a collar attached to the cutting head that moves in the axial direction toward or away from the appurtenant cutting insert.

10. Slot milling cutter according to claim 9, wherein the surface of the insert seats provided with first serrations include at least one threaded hole for receiving an at least one screw passing through a through hole in the appurtenant cutting insert to attach the appurtenant cutting insert to the insert seat.

11. Slot milling cutter according to claim 10, wherein the collar is in direct contact with the appurtenant cutting insert when the appurtenant cutting insert is attached to the insert seat via the at least one screw.

12. Slot milling cutter according to claim 11, wherein the collar moves in the axial direction toward the appurtenant cutting insert when an adjacent set screw is tightened.

13. Slot milling cutter according to claim 1, wherein the means to apply a force to the appurtenant cutting insert in the axial direction is configured to adjust the position of the cutting insert in the axial direction while the first and second serration surfaces remain attached.

* * * * *